United States Patent [19]

Ohlenforst et al.

[11] Patent Number: 4,888,072
[45] Date of Patent: Dec. 19, 1989

[54] ACCESSORY SUPPORT DEVICE FOR VEHICLE WINDSHIELD AND METHOD OF INSTALLING

[75] Inventors: Hans Ohlenforst, Aachen; Heinz Kunert, Cologne, both of Fed. Rep. of Germany

[73] Assignee: Saint-Gobain Vitrage, Courbevoie, France

[21] Appl. No.: 241,632

[22] Filed: Sep. 8, 1988

[30] Foreign Application Priority Data

Sep. 10, 1987 [DE] Fed. Rep. of Germany ....... 3730346

[51] Int. Cl.$^4$ ................................................ B60J 1/02
[52] U.S. Cl. ........................................ 156/108; 52/171; 52/789; 156/293; 248/208; 280/727; 296/37.7; 296/97.5; 296/97.9; 350/631; 428/38
[58] Field of Search ................ 52/171, 789; 156/108, 156/293; 180/90; 248/208; 280/727; 296/37.7, 97.5, 97.9; 350/631, 641; 428/38

[56] References Cited

U.S. PATENT DOCUMENTS

| | | | |
|---|---|---|---|
| D. 294,495 | 3/1988 | Nisslem | 296/97.5 X |
| 3,525,563 | 8/1970 | Loftin | 296/97.5 X |
| 4,114,719 | 9/1978 | Saunders | 180/90 |
| 4,133,405 | 1/1979 | Turek | 180/90 |
| 4,421,190 | 12/1983 | Martinson et al. | 180/90 |

FOREIGN PATENT DOCUMENTS

| | | |
|---|---|---|
| 735452 | 11/1932 | France . |
| 2553352 | 4/1985 | France . |
| 1394271 | 5/1975 | United Kingdom . |
| 2134464 | 8/1984 | United Kingdom . |

*Primary Examiner*—Robert A. Dawson
*Attorney, Agent, or Firm*—Pennie & Edmonds

[57] ABSTRACT

Attached onto a windshield of laminated safety glass for an automobile in the upper region of its face inside the passenger compartment of the vehicle is a shaped panel extending preferably over its entire width, which serves as a support and/or casing for various functional elements such as sun visors, a rear view mirror, speakers and/or automobile clock. This shaped panel, which is equipped with these functional elements, is attached to windshield before mounting it onto the body of the vehicle. In this way, the work done on the vehicle assembly line is simplified.

20 Claims, 2 Drawing Sheets

ACCESSORY SUPPORT DEVICE FOR VEHICLE WINDSHIELD AND METHOD OF INSTALLING

TECHNICAL FIELD

This invention relates to the design and arrangement of the passenger compartment of a motor vehicle and specifically to the location and installation of various accessory features directly upon the front windshield of the vehicle.

BACKGROUND ART

The passenger compartment of a motor vehicle is usually equipped with various functional elements such as adjustable sun visors, interior lighting switches, rear view mirror, speakers and a clock. These elements are generally arranged such that they may be operated by either the driver or an adjacent passenger.

Conventionally, several of these functional elements are installed in or on the dashboard while other elements, such as the sun visors and interior lights, are installed on the body of the vehicle, above the windshield, in which case openings, specifically for this purpose, must be provided in the body for attachment of these elements during final mounting on the chassis.

SUMMARY OF THE INVENTION

This invention relates primarily to the front windshield, but it is entirely possible to provide the rear window or the side panes with a panel of this type which will then be equipped with elements of another type.

The object of this invention is to simplify the design of the passenger compartment of a motor vehicle and to reduce the assembly time of the vehicle.

For this purpose, the invention proposes to place a shaped panel, having a top side, a bottom side, two lateral sides and a front face which features two lateral portions and a central protruding portion, onto the inside passenger compartment face of the windshield along the upper edge and preferably extending over its entire width. This shaped panel will serve as a support and/or casing for various functional elements. In particular sun visors, rear view mirrors, interior lights with their switches, an automobile clock and speakers.

In one embodiment of the invention, the panel can be connected, by a corresponding connecting vent, to the heating and ventilating system of the vehicle. The panel may be provided with appropriate blowing vents that can be directed toward the windshield which serves to improve the speed of the defrosting and defogging of the windshield. If applicable, auxiliary vents can also be placed on the face of the panel adjacent to the roof to improve the circulation of the air in the passenger compartment by directing air current toward the roof of the vehicle contributing to improved comfort.

The panel may, if desired, be fastened to the windshield, as a preassembled part, before installing the windshield on the body of the car. The connections corresponding to the electrical system and, if applicable, to the ventilation system will have to be made during installation of the panel. The conduits necessary for the connection are to be provided at the desired position in the body of the vehicle, for example, along or inside pillars which connect the roof to the body of the vehicle.

The use of such a preassembled panel by the automobile manufacturer will save preparation and assembly work on the body and the interior equipment. Die stampings normally necessary to form the pieces of sheet metal and the insertion of bolts for the fastening of sun visors, of various knobs and of the interior light may be eliminated. During assembly of the vehicle an entire series of assembly work is eliminated, such as the mounting of the sun visors, the installation of the interior lighting, clock, speakers and various switches. All of these parts are already mounted on the panel and consequently, do not have to be introduced on the assembly line as isolated parts.

Attaching the pre-equipped panel to the windshield makes use of fastening brackets which are glued to the windshield by the windshield manufacturer. The panel is attached to these brackets before the installation of the windshield onto the automobile body. The attaching can be done by bolts or other ordinary means such as clips or interlocking holding devices.

The windshield consists of laminated glass which will maintain a considerable cohesion in case one of the sheets of glass is broken, so that the panel remains securely attached, even if the windshield is broken.

BRIEF DESCRIPTION OF THE DRAWINGS

Further benefits and advantages of the invention will become apparent from a consideration of the following description given with reference to the accompanying drawings figures which specify and show preferred embodiments of the invention, and wherein.

DETAILED DESCRIPTION OF THE PREFERRED EMBODIMENTS

Figure 1:
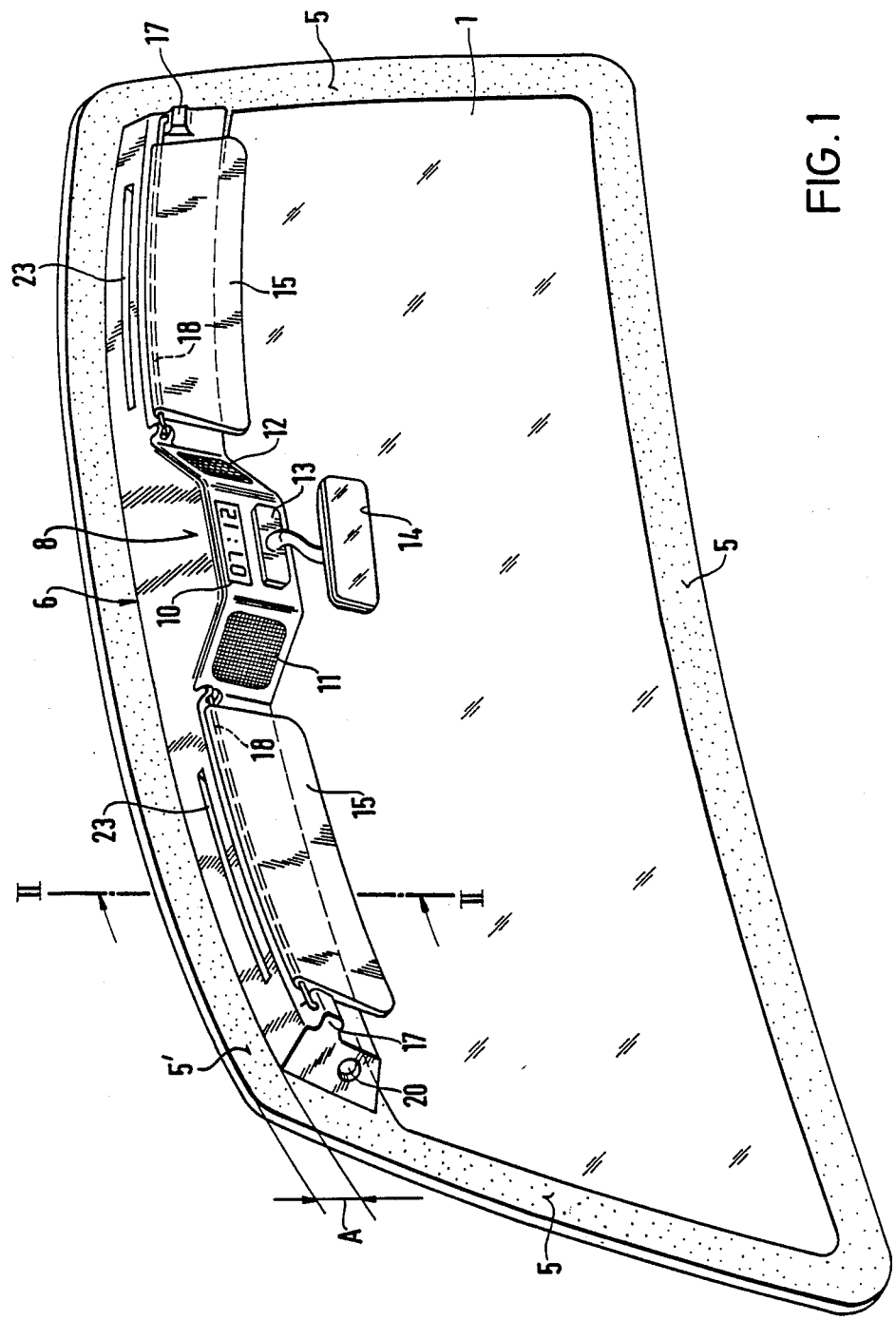
FIG. 1: a perspective of an automobile windshield equipped with the accessory support panel of the invention.

Windshield 1 comprises two sheets 2 and 3 of silicate glass glued to one another having a thermoplastic interlayer 4 over their entire surface.

Along its peripheral edge, windshield 1 is provided with an opaque coating 5 forming a frame. Opaque coating 5 comprises a layer of colored enamel, baked onto the surface of the glass during the heat treatment for bending of the glass sheet. Along the upper edge of the windshield at 5', the coating is wide enough to hide panel 6 from direct view from outside the vehicle.

Panel 6 is attached to the inner face of windshield 1 along its upper edge while maintaining a distance A relative to the edge of the windshield and extends substantially over the entire width of windshield 1. Distance A is measured so that windshield 1 and panel 6 can be mounted in the frame of the window without interfering with the attachment edge of the body.

Panel 6 is constructed as a single piece and comprises a hollow body of plastic, produced by a known process of pressing and deep drawing. Panel 6 is provided with all the openings and reinforcements necessary for the mounting of various elements on its surface or in its interior.

Panel 6, as illustrated, has two lateral portions and a protruding central portion 8 directed toward the interior of the passenger compartment. In panel 6, various elements can be placed, such as a digital clock 10 and two speakers 11 and 12. A mirror support 13 and a rear view mirror 14 are also mounted on the protruding portion 8 of the panel.

On the two lateral portions of panel 6, adjacent to the protruding portion 8, may be attached two sun visors 15 using pivot part 17 and holding pin 18. The pivot part 17 is an integral part of panel 6.

On one of its lateral sides, panel 6 may be provided with an opening 20 for connection to the ventilation system of the vehicle. Opening 20 is operatively associated with the conduits or recesses through which air is conducted to slot-shaped vents 22 and 23. Vents 22 are directed toward the windshield surface and vents 23 toward the roof of the vehicle. Suitable registers and/or flaps can also be mounted in panel 6 to regulate the flow and direction of the air current through the vents.

Panel 6 is configured on its under surface to be mounted upon brackets 25. For this purpose, mounting brackets 25 are attached to the surface of the windshield on opaque layer 5', using appropriate layers of glue 26. To obtain a particularly good attachment of mounting brackets 25 on the layers of glue 26, said brackets 25 are provided with holes 27 through which a portion of glue mass 26 flows. Mounting brackets 25 have upper and lower notched projecting parts 28 which engage a corresponding notched projecting part 29 on the inner surface of panel 6.

Figure 2:
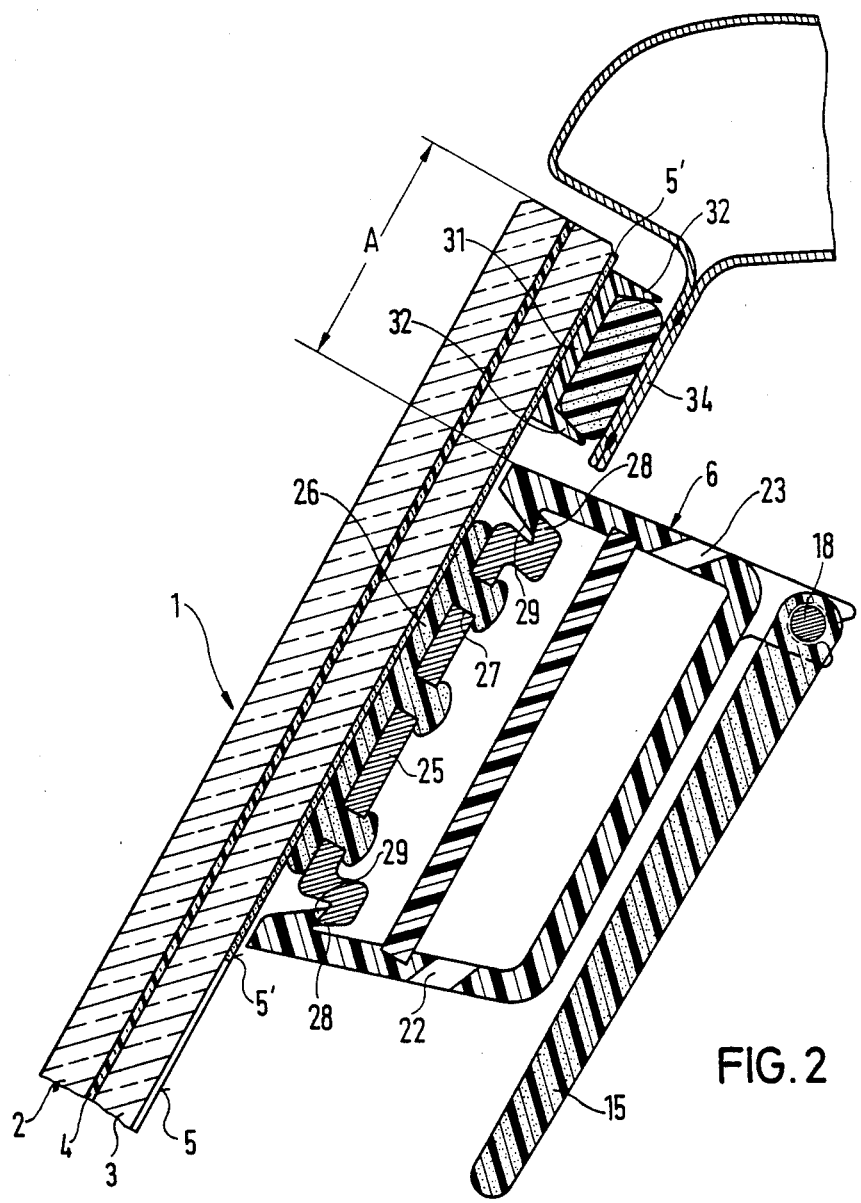
FIG. 2: is a sectional view through line II—II of FIG. 1.

Mounting brackets 25 may be glued to the windshield 1 in the windshield production workshop. Also, windshield 1 can, as is seen in FIG. 2, be provided in this shop with a spacer 31, which exhibits in cross section two peripheral portions 32 that taper to a wedge. These peripheral portions 32 are used to delimit the glue layer 33 with which the windshield 1 is glued to attachment edge 34 of the body.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

We claim:

1. An accessory support panel for installation within a motor vehicle, said panel comprising:
    (a) a shaped sheet of laminated safety glass for mounting on a body portion of said motor vehicle, said glass sheet having an inner and an outer surface and at least partially defining a boundary between a passenger compartment within said vehicle and an external portion of said vehicle;
    (b) at least one bracket means configured and adapted for removably mounting said accessory support panel upon said glass sheet, said at least one bracket means secured to said inner surface of said glass sheet along an upper portion thereof; and
    (c) an accessory support panel mounted along said upper portion of said glass sheet by said at least one mounting bracket means, said panel configured and adapted for installation thereon of one or more vehicle accessory means.

2. The accessory panel of claim 1 wherein said glass sheet is an automobile windshield.

3. The accessory panel of claim 2 wherein said windshield further comprises, on said inner surface at a location adjacent that at which said panel is to be installed, a layer of an opaque coating material adapted to prevent direct observation of said panel therethrough from outside said vehicle.

4. The accessory panel of claim 3 wherein each said bracket means is adhesively secured to said inner surface of said windshield upon a portion of said opaque coating layer.

5. The accessory panel of claim 4 wherein said panel is removably mounted on said at least one bracket means by means selected from bolts, clips and interengaging fastener means.

6. The accessory panel of claim 5 wherein each said bracket means comprises a substantially planar base portion having an upper end and a lower end, each said end provided with outwardly projecting flange means configured and adapted for engaging corresponding flange means on an under surface of said panel to retain said panel in a predetermined position upon said windshield.

7. The accessory panel of claim 6 wherein each said bracket means further comprises at least one aperture defined by said base portion, said aperture configured to permit a portion of said adhesive to pass therethrough when said bracket means is pressed thereon to facilitate attachment between said bracket means and said coated windshield portion.

8. The accessory panel of claim 7 wherein said panel extends substantially completely across the width of said windshield.

9. The accessory panel of claim 8 wherein said vehicle accessory means is at least one adjustable sun visor.

10. The accessory panel of claim 8 wherein said vehicle accessory means is a rear view mirror.

11. The accessory panel of claim 8 wherein said vehicle accessory means is a switch for controlling interior illumination within said passenger compartment.

12. The accessory panel of claim 8 wherein said vehicle accessory means is a light.

13. The accessory panel of claim 8 wherein said vehicle accessory means is one or more speakers operatively associated with an accessory device selected from a radio, a tape player, a compact disc player, and the like.

14. The accessory panel of claim 8 wherein said vehicle accessory means is a clock.

15. The accessory panel of claim 1 wherein said panel has installed thereupon at least one vent means operatively associated with a heating/ventilation system installed within said vehicle.

16. The accessory panel of claim 15 which further comprises air deflection means operatively associated with said vent means, said deflection means configured and adapted for regulating a flow of air through said vent means.

17. The accessory panel of claim 16 wherein said vent means are directed toward a roof portion of said vehicle to facilitate movement of air within said vehicle to improve the comfort of the occupants thereof.

18. The accessory panel of claim 16 wherein said vent means is directed toward said glass sheet to facilitate removal of condensate therefrom.

19. An accessory support panel for installation within a motor vehicle, said panel comprising:
    (a) a windshield mounted upon a body portion of said vehicle, said windshield having an inner and an outer surface and at least partially defining a boundary between a passenger compartment within said vehicle and an external portion of said vehicle, said windshield comprising, on an interior portion thereof at a location adjacent that at which said panel is to be installed, a layer of an opaque coating material adapted to prevent direct observation of said panel therethrough from outside said vehicle;

(b) at least one bracket adhesively secured to said inner surface of said windshield along an upper portion thereof, each said bracket configured and adapted for removably mounting said accessory support panel upon said inner surface of said windshield, wherein each said bracket comprises a substantially planar base portion having an upper end and a lower end, each said end provided with outwardly projecting flange means configured and adapted for engaging corresponding flange means on an under surface of said panel to retain said panel in a predetermined position upon said windshield, said base portion of each said bracket defining at least one aperture configured to permit a portion of said adhesive to pass therethrough when said bracket is pressed therein to facilitate attachment between said bracket and said coated windshield portion; and (c) an accessory support panel removably mounted upon said brackets along said upper portion of said inner surface of said windshield, said panel extending substantially completely across the width of said windshield and configured and adapted for installation thereon of at least one vehicle accessory means selected from sun visors, mirrors, switches for controlling illumination within said passenger compartment, a clock and speakers.

20. A method for detachably installing a vehicle accessory support panel within a passenger compartment of a motor vehicle, said method comprising:

(a) preparing a shaped sheet of laminated safety glass, said glass sheet adapted for installation on a body portion of said vehicle, and extending at least partially within said passenger compartment;

(b) coating at least a peripheral portion of said glass sheet with an opaque material, said opaque material comprising at least one layer of a colored enamel;

(c) placing at least one discrete deposit of an adhesive compound upon said enamel coating along an upper peripheral portion of said glass sheet;

(d) pressing bracket means into each said deposit of adhesive compound such that at least a portion of said adhesive compound extrudes through at least one aperture defined by said bracket means to facilitate attachment between said bracket means and said glass sheet;

(e) removably mounting said accessory support panel upon said glass sheet by said bracket means;

(f) installing said glass sheet having said support panel mounted thereupon into frame means defined by said motor vehicle body portion; and (g) connecting one or more vehicle accessory means located upon said panel to corresponding actuation means located within said passenger compartment to permit the operation of said accessory means.

* * * * *